(12) United States Patent
Abbott et al.

(10) Patent No.: US 11,470,030 B2
(45) Date of Patent: *Oct. 11, 2022

(54) TEMPORARY SUSPENSION OF ELECTRONIC COMMUNICATIONS

(71) Applicant: Acoustic, L.P., New York, NY (US)

(72) Inventors: Matthew V. Abbott, Marietta, GA (US); David Alvarado, Corona, CA (US); Jason B. Brett, Woodstock, GA (US); Eric Busler, Orange, CA (US); Jason Cai, Alhambra, CA (US); Jeffrey S. Dernavich, Atlanta, GA (US); Sergey Tsymbler, Irvine, CA (US)

(73) Assignee: Acoustic, L.P., Atlanta, GA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/221,721

(22) Filed: Apr. 2, 2021

(65) Prior Publication Data

US 2021/0297378 A1 Sep. 23, 2021

Related U.S. Application Data

(63) Continuation of application No. 15/372,843, filed on Dec. 8, 2016, now Pat. No. 10,972,415, which is a continuation of application No. 13/357,942, filed on Jan. 25, 2012, now Pat. No. 9,548,953.

(51) Int. Cl.
*H04L 12/58* (2006.01)
*H04L 51/212* (2022.01)
*G06Q 10/10* (2012.01)
*G06Q 30/02* (2012.01)
*G06Q 50/00* (2012.01)

(52) U.S. Cl.
CPC .......... *H04L 51/212* (2022.05); *G06Q 10/10* (2013.01); *G06Q 30/0251* (2013.01); *G06Q 30/0264* (2013.01); *G06Q 30/0272* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 5,864,684 A | 1/1999 | Nielsen | |
| 5,913,039 A | 6/1999 | Nakamura et al. | |
| 7,376,701 B2 | 5/2008 | Bhargava et al. | |
| 7,634,543 B1 | 12/2009 | Van Zant et al. | |
| 7,822,819 B1 | 10/2010 | Levosky | |
| 8,060,572 B2 | 11/2011 | Brown et al. | |
| 8,213,946 B2 | 7/2012 | Ahopelto et al. | |

(Continued)

*Primary Examiner* — Sanchit K Sarker
(74) *Attorney, Agent, or Firm* — Mauriel Kapouytian Woods LLP; Benjamin Charkow (57) ABSTRACT

Disclosed are various embodiments for a transmission service to suspend temporarily transmission of electronic communications to a recipient. In one embodiment, the transmission service receives a request to suspend receiving electronic communications temporarily for a suspension period. In response, the transmission service suspends transmitting electronic communications to the recipient during the duration of the suspension period. Then, the transmission service resumes transmitting electronic communications to the recipient upon the expiration of the suspension period.

17 Claims, 6 Drawing Sheets

(56) References Cited

U.S. PATENT DOCUMENTS

| | | | |
|---|---|---|---|
| 8,312,660 B1* | 11/2012 | Fujisaki | F41A 17/08 455/457 |
| 8,566,406 B2 | 10/2013 | Carvalho Neto et al. | |
| 8,793,325 B2* | 7/2014 | Kessler | H04L 67/62 370/235 |
| 8,843,566 B2 | 9/2014 | Thompson | |
| 8,918,521 B2 | 12/2014 | Bergman et al. | |
| 9,037,853 B2* | 5/2015 | Rozek | H04L 63/123 713/161 |
| 9,548,953 B2 | 1/2017 | Dernavich et al. | |
| 10,972,415 B2 | 4/2021 | Abbott et al. | |
| 2001/0049745 A1* | 12/2001 | Schoeffler | H04L 51/48 709/206 |
| 2003/0204568 A1* | 10/2003 | Bhargava | H04L 51/214 709/206 |
| 2003/0233413 A1* | 12/2003 | Becker | G06Q 10/107 709/206 |
| 2004/0054733 A1 | 3/2004 | Weeks | |
| 2004/0054741 A1 | 3/2004 | Weatherby et al. | |
| 2004/0172385 A1* | 9/2004 | Dayal | G06F 16/24561 |
| 2005/0097179 A1 | 5/2005 | Orme | |
| 2006/0004736 A1 | 1/2006 | Fair et al. | |
| 2008/0250114 A1 | 10/2008 | Dubovsky et al. | |
| 2009/0025047 A1* | 1/2009 | Choi | H04N 7/17318 725/91 |
| 2010/0217615 A1* | 8/2010 | Brown | H04L 67/54 455/410 |
| 2010/0291953 A1* | 11/2010 | Ahopelto | H04W 4/16 455/466 |
| 2012/0143692 A1* | 6/2012 | Packer | G06Q 30/0267 705/14.64 |
| 2012/0303429 A1* | 11/2012 | Nolledo | G06Q 30/02 726/4 |
| 2013/0031161 A1* | 1/2013 | Yang | G06F 9/485 709/203 |
| 2013/0166657 A1 | 6/2013 | Tadayon | |

\* cited by examiner

FIG. 1

Mailing

| Recipient_ID | Active_Status |
|---|---|
| 1357 | 1 |

Transmitting

| Recipient_ID | Suspension_Status | Date_Resume |
|---|---|---|
| 1357 | 0 | - |
| 1358 | 1 | 01-10-2012 |
| 1359 | 0 | - |

TEMPORARY SUSPENSION OF ELECTRONIC COMMUNICATIONS

CROSS REFERENCE TO RELATED APPLICATIONS

This application is a continuation application of U.S. application Ser. No. 15/372,843, filed Dec. 8, 2016, which is a continuation application of U.S. application Ser. No. 13/357,942, filed Jan. 25, 2012. The entire contents of these applications are hereby incorporated herein by reference.

FIELD

This disclosure relates generally to computer technology, including hardware and software, that is usable to allow a transmission of an electronic message to be suspended.

BACKGROUND

Commercial and non-commercial entities engage in marketing campaigns to promote the sale of a variety of products and services, and/or elicit contributions. For example, retailers may distribute advertisements, fliers, mailings, electronic communications and/or other types of marketing materials to announce sales and promote the sale of items. Retailers may communicate directly with the potential customer through electronic communications such as email, social network and/or SMS messaging.

Recipients of the electronic communications may wish to stop the transmission of the electronic communications for a period of time. For example, a recipient may wish to stop the transmission of electronic communications to prevent overcrowding of an inbox while on vacation or during a particular season such as the Christmas holiday season. Recipients may then desire to resume receiving electronic communications subsequent to a particular time. Current systems are capable of receiving requests from recipients to remove the recipients' identification from mailing lists, but are not capable of sending electronic communications to recipients after a certain time period. However, the transmission of electronic communications may not resume after the period of time expires if the recipient does not re-subscribe receiving the electronic communications. Accordingly, systems and methods are desirable that can allow a recipient to suspend temporarily receipt of certain electronic communications.

SUMMARY

One aspect is a tangible computer-readable medium that embodies a program executable in a computing device. The program includes code that can receive a first request to suspend transmission of electronic communications to a recipient during a suspension period. The first request can be associated with a recipient identifier (ID). The program includes code that can associate the recipient ID with a suspension state in response to receiving the first request to suspend transmission of the electronic communications. The program includes code that can receive a second request to transmit an electronic communication to the recipient. The program includes code that can prevent transmitting the electronic communication to the recipient during the suspension period based on the association of the recipient with the suspension state.

In another embodiment, a system includes at least one computing device and a transmission service that is executable in the at least one computing device. The transmission service includes logic configured to receive a request to suspend transmission of electronic communications to a recipient during a suspension period. The transmission service further includes logic configured to suspend transmitting the electronic communications to the recipient during the suspension period by associating a suspension state to a recipient ID representing the recipient. The transmission service includes logic configured to resume transmitting the electronic communications to the recipient after the suspension period expires.

In another embodiment, a method is provided. The method includes receiving, by a computing device executing code stored on a tangible medium, a request to suspend transmission of promotional electronic communications to a recipient for a suspension period. The request includes a recipient ID for the recipient. The recipient ID is associated with a suspension state by a computing device. Transmission of the promotional electronic communications to the recipient is suspended by the computing device during the suspension period by preventing the promotional electronic communications from being transmitted to the recipient based on the suspension state being associated with the recipient ID. The recipient ID is de-associated with the suspension state by the computing device and at least one of the promotional electronic communications is transmitted to the recipient in response to determining an expiration of the suspension period.

These illustrative aspects are mentioned not to limit or define the disclosure, but to provide examples to aid understanding thereof. Additional aspects and embodiments are discussed in the Detailed Description, and further description is provided there. Advantages offered by one or more of the various aspects and embodiments may be further understood by examining this specification or by practicing one or more aspects and embodiments presented.

BRIEF DESCRIPTION OF THE DRAWINGS

Many aspects of the present disclosure can be better understood with reference to the following drawings. The components ark the drawings are not necessarily to scale, emphasis instead being placed upon clearly illustrating certain features of the disclosure. Moreover, in the drawings, like reference numerals designate corresponding parts throughout the several views.

DETAILED DESCRIPTION

Certain aspects and embodiments relate to suspending temporarily the transmission of electronic communications to a recipient in response to receiving a request from the recipient to suspend transmission for a definite period of time. Certain embodiments obviate the need to remove a recipient identification permanently from a list of recipients (i.e., by placing the recipient identification on a "do not contact" list), while also allowing recipients more control over the electronic communications transmission process.

Systems according to some embodiments can leverage data relationships between, for example, a recipient identifier (ID), an active status indicator, and a suspension status indicator, to avoid disrupting an electronic communication process. For example, an electronic communication transmission engine can formulate electronic communications for each recipient ID in a table that is associated with an active status that represents that the respective recipient is in an active status, which may mean that the engine is to formulate and transmit an electronic communication to the recipient. The active status may be periodically updated using a second table that includes suspension information associated with recipient IDs. For a recipient ID associated with a suspension status that indicates the respective recipient has requested a temporary suspension the system can update the first table using the relationship of the first table and the second table to change the active status in the first table to indicate that the engine is to not send the recipient an electronic communications. The second table can include suspension information such as a date to resume electronic communications transmission to a recipient that is associated with the recipient ID. In some embodiments, the system can determine that the date to resume electronic communications transmission is the current date or a past date, and change the active status in the first table during the next periodic update. Subsequently, the engine can formulate an transmit electronic communications to the associated recipient.

In one embodiment, a transmission service that includes the engine may insert a selectable hyperlink in the electronic communications. The hyperlink may correspond to a request to suspend transmission of electronic communications temporarily. Selection of the hyperlink by a recipient causes a recipient ID and the temporary suspension request to be transmitted to the system. In response to receiving the request, the transmission service configures the data associated with the recipient ID accordingly, e.g. the data in the second table described above, or may deliver to the recipient a web page that includes options for affirming the temporary suspension request and receiving from the recipient a suspension end date. In another embodiment, the transmission service provides a network page that is accessible to the recipient, such as through a browser and/or through a hyperlink included in the electronic communication. The network page can include fields to receive from the recipient information associated with the temporary suspension request. The information may include recipient contact information, affirmation of the request, a suspension end date, and/or any other recipient provided instructions.

In the following discussion, a general description of the system and its components is provided, followed by a discussion of the operation of the same.

Figure 1:
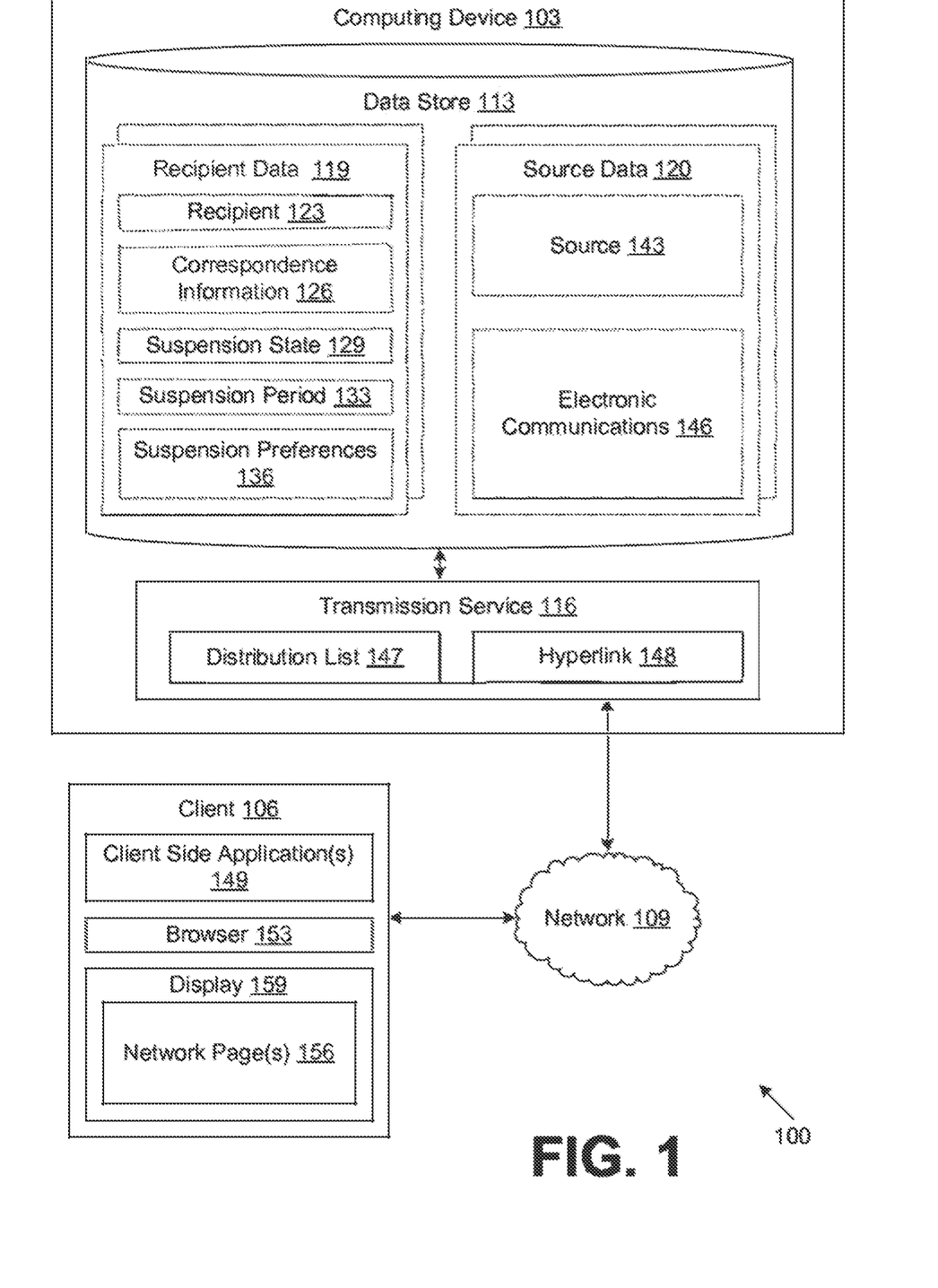
FIG. 1 is a block diagram of a networked environment according to one embodiment of the present disclosure.

FIG. 1 illustrates a networked environment 100 according to some embodiments. The networked environment 100 includes computing device 103, a client 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may include, for example, a server computer or any other system capable of providing computing capability. Although one computing device 103 is depicted, certain embodiments of the networked environment 100 include more than one computing device. For example, one or more computing devices 103 may be employed and arranged, for example, in one or more server banks or computer banks or other arrangements. The computing devices together may include a cloud computing resource, a grid computing resource, and/or any other distributed computing arrangement. Such computing devices may be located in a single installation or may be distributed among many different geographical locations. For purposes of convenience, the computing device 103 is referred to herein in the singular.

Various applications and/or other functionality may be executed in the computing device 103 according to certain embodiments. In addition, various data is stored in a data store 113 that is accessible to the computing device 103. The data stored in the data store 113, for example, may be accessed, modified, removed, and/or otherwise manipulated in association with the operation of the applications and/or functional entities described below.

The components executed on the computing device 103 can include a transmission service 116, and other applications, services, processes, systems, engines, or functionality not discussed in detail herein. The transmission service 116 can be executed to transmit electronic communications 146 to recipients. In one embodiment, the transmission service 116 provides for the recipient to suspend receiving electronic communications temporarily for a specified period of time. In some embodiments, during the suspension period, the transmission service 116 may store the electronic communications 146 scheduled to be delivered to the recipient in a data store to be accessed at a later time. In other embodiments, the transmission service 116 avoids transmitting electronic communications 146 to the recipient that are scheduled for transmission during the suspension period.

The data stored in the data store 113 includes, for example, one or more recipient data 119, one or more source data 120, and potentially other data. The source data 120 includes various data associated with Commercial and non-commercial entities that provide electronic communications for transmission to the recipients. Each source data 120 may include a source name that may be represented by a unique source 143 identifier. Additionally, each source data 120 includes electronic communications 146 provided by the source 143. For example, the electronic communications 146 may include promotional material, such as, advertisements, marketing information, and/or other promotional material. In one instance, the electronic communications 146 may be emails advertising an ongoing sale for a product offered by the source 143. In another embodiment, the electronic communications 146 may not be of a promotional variety. For example, the electronic communications may include newspapers, newspapers, periodicals, journals, magazines, and/or other publications provided by a variety of entities.

The recipient data 119 includes various data associated with each one of the authorized recipients of the electronic communications 146. Each recipient data 119 may include recipient names, such as a unique recipient 123 identifier, and/or other data. Additionally, each recipient data 119 also includes correspondence information 126, a suspension state 129, a suspension period 133, and a set of suspension preferences 136. In one embodiment, the correspondence information 126 may include a plurality of email addresses, social networking handles, short message service (SMS) handles, facsimile handles, and/or any other type of correspondence information that can be used to transmit electronic communications 146 to the recipient 123. The correspondence information may be provided by the recipient 123 and/or another source.

The suspension state 129 indicates whether the recipient 123 has requested to suspend temporarily receiving electronic communications 146. In one embodiment, the suspension state 129 may be a Boolean value (i.e., '1' or '0') that indicates whether the recipient 123 has suspended receiving electronic communications. For example, a Boolean '1' may indicate that that the recipient 123 has suspended receiving electronic communications and a Boolean '0' may indicate that the recipient 123 has not suspended receiving electronic communications. In other embodiments, the suspension state 129 may be represented in a variety of other ways, such as, for instance, a multi-digit numerical value, a character, a character string, and/or other data types.

The suspension period 133 represents a period of time during which transmission of the electronic communications 146 to the recipient 123 has been temporarily suspended. In one embodiment, the transmission service 116 may receive from the recipient 123 a range of dates, a number of days, weeks, months, and/or other duration during which transmission of the electronic communications 146 should be suspended. Additionally, the transmission service 116 may receive from the recipient 123 a resume date that represents the date when transmission of electronic communications 46 should resume. In another embodiment, the suspension period 133 may be a default duration and/or a duration.

The suspension preferences 136 represents a fisting of preferences received by the transmission service 116 that regulate the suspension of receiving electronic communications. For example, the transmission service 116 may receive a request from the recipient 123 to suspend receiving electronic communications 146 from a particular sender, with keywords a subject line, related to a specified subject matter, and/or any other suspension preference 136. Additionally, the recipient 123 may specify suspending receipt of all electronic communications 146 except for those electronic communications 146 that satisfy the suspension preferences 136.

Additionally, in some embodiments, the recipient data 119 may also include a collection of suspended communications representing a plurality of stored electronic communications 146 that were scheduled to be delivered to the recipient 123 during the suspension period 133. In one embodiment, the recipient 123 may request that the electronic communications 146 be stored for accessing at a later time. For example, the recipient 123 may wish to browse the suspended communications at a later time. In another embodiment, the collection of suspended communications representing the stored electronic communications 146 may be automatically delivered to the recipient 123 when the suspension of the receipt of electronic communications 146 expires. For example, the collection of suspended communications may be packaged together and transmitted to the recipient as one communication.

The client 106 is representative of one or more client devices that may be coupled to the network 109. The client 106 may include, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a client side application 149, a browser 153 and/or other applications. The client 106 may be configured to execute client side applications 149 applications such as, for example, email applications, instant message applications, and/or other applications. The browser 153 may be executed in a client 106, for example, to access and render network pages 156, such as web pages, or other network content provided by the computing device 103 and/or other servers. For instance, the browser 153 may render the network pages 156 on a display 159 associated with the client 106.

A recipient 123 on a client 106 registers a recipient data 119 with the transmission service 116 by manipulating one or more network pages 156 generated by the transmission service 116. For example, the transmission service 116 may prompt the recipient 123 to provide identifying information such as, a unique recipient identifier, correspondence information 126, and/or any other data. In one embodiment, registering a recipient account may allow the transmission service 116 to facilitate transmission of electronic communications 146.

The recipient 123 may then wish to suspend receipt of electronic communications 146. In one embodiment, the transmission service 116 may include a hyperlink 148 to request the suspension in each electronic communication 146 transmitted to the recipient 123. For example, the hyperlink 148 may be included at the end of an email communication transmitted to the recipient 123. Further, the hyperlink 148 may include descriptive text, such as, "Click here to suspend receiving emails," or the like. Additionally, a unique identifier may be embedded within the hyperlink 148 that uniquely identifies the recipient 123 invoking the hyperlink 148. When the recipient invokes the hyperlink 148, the transmission service 116 receives the request to suspend receipt of electronic communications 146 and the unique identifier identifying the recipient 123.

Additionally, the transmission service 116 may include more than one hyperlink 148 in the electronic communication 146 where each one transmits a different type of suspension request when invoked by the recipient 123, For example, invoking one of the hyperlinks 148 transmit a request to suspend receipt of the electronic communications 146 for a default suspension period 133. The default suspension period 133 may be any period of time established by the transmission service 116, provided by the source 143 of the electronic communications 146, and/or any other period. Invoking other hyperlinks 148 may transmit requests to suspend receipt of electronic communications 146 for different suspension periods 133. For example, the hyperlinks may include descriptive text indicating a d ration of the suspension period 133, such as, a number of days, a number of weeks, a number of months, and/or any other duration of time.

In another embodiment, the recipient 123 may access the transmission service through a network page 156 to suspend receipt of electronic communications 148. Upon accessing, the transmission service 116 may prompt the recipient 123 to indicate a suspension period 133 and list any suspension preferences 36. For example, the recipient 123 may wish to suspend receipt of electronic communications 146 from a specified source 143, about a specified item, and/or any other characteristic. In response, the transmission service 116 may then manipulate the suspension state 129 associated with the recipient 123 to indicate that the recipient 12 has temporarily suspended receipt of the electronic communications 146. Additionally, the recipient 123 may request to store the electronic communications 146 scheduled to be delivered to the recipient 123 during the suspension period 133 for access at a later time. For instance, the transmission service 116 may store those electronic communications 146 as suspended communications 139 in association with the recipient data 119 of the recipient 123.

In another embodiment, the transmission service 116 may automatically determine to suspend transmission of electronic communications 146 based on external factors. For example, the transmission service 116 may identify a magnitude of sales to a recipient 123 that is related to the transmission of the electronic communications 146. If the magnitude of sales does not exceed a threshold level, the transmission service 116 may determine to suspend transmission of the electronic communications 146 for a predetermined suspension period 133. In this embodiment, a sale may be related to the transmission of the electronic communication 146 if the recipient 123 initiates a transaction by invoking a hyperlink included in the electronic communication 146. The transmission service 116 may suspend transmission of the electronic communications 146 to the recipient 123 if the magnitude of sales resulting from the transactions do not exceed a threshold level.

In one embodiment, the transmission service 116 operates to transmit electronic communications 146 with content provided by one or more sources 143 to recipients 123 on a period basis, such as, for instance, hourly, daily, and/or any other frequency. The transmission service 116 may receive a distribution list 147 that includes correspondence information 126 of all the recipients 123 scheduled to receive the electronic communications 146. Alternatively, the transmission service 116 may generate the distribution list 147 based on information contained within the recipient data 119, as can be appreciated.

Upon identifying the distribution list 147, the transmission service 116 parses the entries in the distribution list 147 to identify a first recipient 123 on the distribution list 147, the correspondence information 126 of the first recipient 123, and the suspension state 129 of the first recipient 123. The transmission service 116 then determines whether the suspension state 129 indicates that the first recipient 123 has temporarily suspended receiving electronic communications 146. For example, the suspension state 129 may be a Boolean value indicating that the first recipient 123 has not temporarily suspended receiving the electronic communications 146. In this instance, the transmission service 116 facilitates the transmission of electronic communications 146 to the first recipient 123.

As another example, the suspension state 129 may be a Boolean value indicating that the first recipient 123 has temporarily suspended receiving the electronic communications 146. In this instance, the transmission service 116 does not facilitate the transmission of the electronic communications 146 to the first recipient 123. In one embodiment, the recipient 123 may have requested that the electronic communications 146 scheduled to be delivered during the suspension period 133 be stored for accessing at a later time. Accordingly, the transmission service 116 may insert the electronic communications 146 in the collection of suspended communications associated with the first recipient 123. For example, the suspended communications may be a collection of communications that can be modified to insert the electronic communications 146. Upon processing the first recipient 123 on the distribution list 147, the transmission service 116 advances to the next recipient 123 on the distribution list 147 and initiates the transmission process, as described above, until all of the recipients 123 in the distribution list 147 have bee processed.

Figure 2:
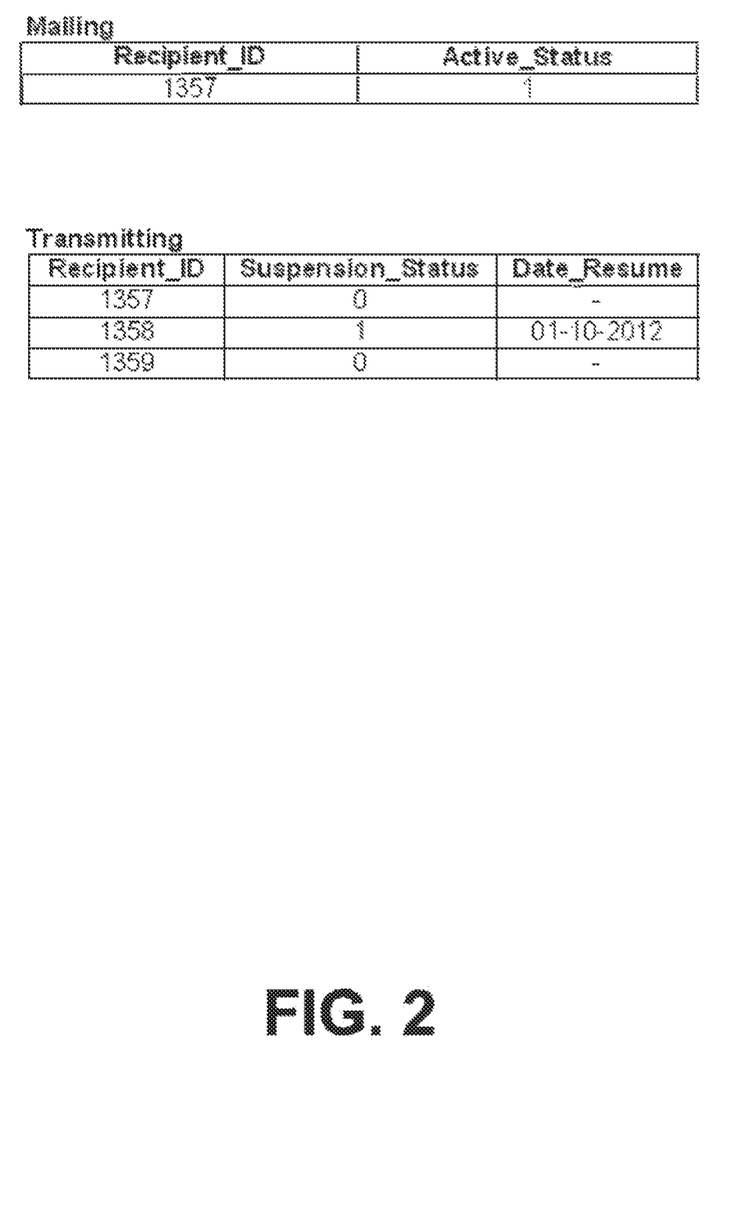
FIG. 2 depicts data relationships usable to associate codes with attributes of an electronic message according to one embodiment of the present disclosure.

Data relationships can be used to allow the transmission service determine whether to transmit an electronic communication 146 to a recipient 123. FIG. 2 depicts examples of data relationships that can be stored in the data store 113 or in a separate storage device, such as a database, that is communicatively coupled to the computing device 103. The data relationships include two tables of data that can be associated with each other through a recipient identifier (shown in the tables as "Recipient_ID"). The recipient identifier can be decrypted from a code or can be associated with a randomly generated code. Alternatively, the recipient identifier may be similar to the recipient 123 data stored in the data store 113.

The mailing table includes the recipient 123 ("Recipient_ID") and active indicator ("Active_Status"). The mailing table may include a variety of entries where each of the entries depict data from the recipient data 119. In this example, the "Recipient_ID" may represent the recipient 123 and the "Active_Status" indicates whether to include the recipient 123 represented by the "Recipient_ID" in the distribution list 147. For instance, the "Active_Status" may be represented by a Boolean value where a "1" indicates that the recipient 123 represented by the "Recipient_ID" should be included in the distribution list 147. Similarly, a Boolean of "0" may indicate that the recipient 123 represented by the "Recipient_ID" should not be included in the distribution list 147. The transmission service 116 may build the distribution list 147 by processing each entry in the mailing table as described above.

The transmitting table includes the recipient 123 ("Recipient_ID"), a suspension state 129 ("Suspension_Status"), and a suspension period 133 ("Resume_Date"). The transmitting table may include several entries of recipients 123 ("Recipient_ID") that are associated with the "Active_Status." The "Suspension_Status" may be a Boolean value indicating whether the recipient 123 has requested that transmission of electronic communications 146 be temporarily suspended. For instance, a Boolean value of "1" may indicate that the recipient 123 associated with the "Recipient_ID" has previously requested that transmission of the electronic communications 146 be suspended. In one embodiment, the "Suspension_Status" may be similar to the suspension state 129.

Additionally, the "Date_Resume" may represent a date on which transmission of electronic communications 146 to the recipient 123 resumes. In one embodiment, the "Date_Resume" field may only be active for a "Recipient_ID" when the recipient 123 associated with the "Recipient_ID" has requested the temporary suspension. The "Date_Resume" may indicate a date for resuming transmission of the electronic communications 146 to the recipient 123. In one embodiment, the "Date_Resume" may be a character string that is similar to the suspension period 133.

Figure 3:
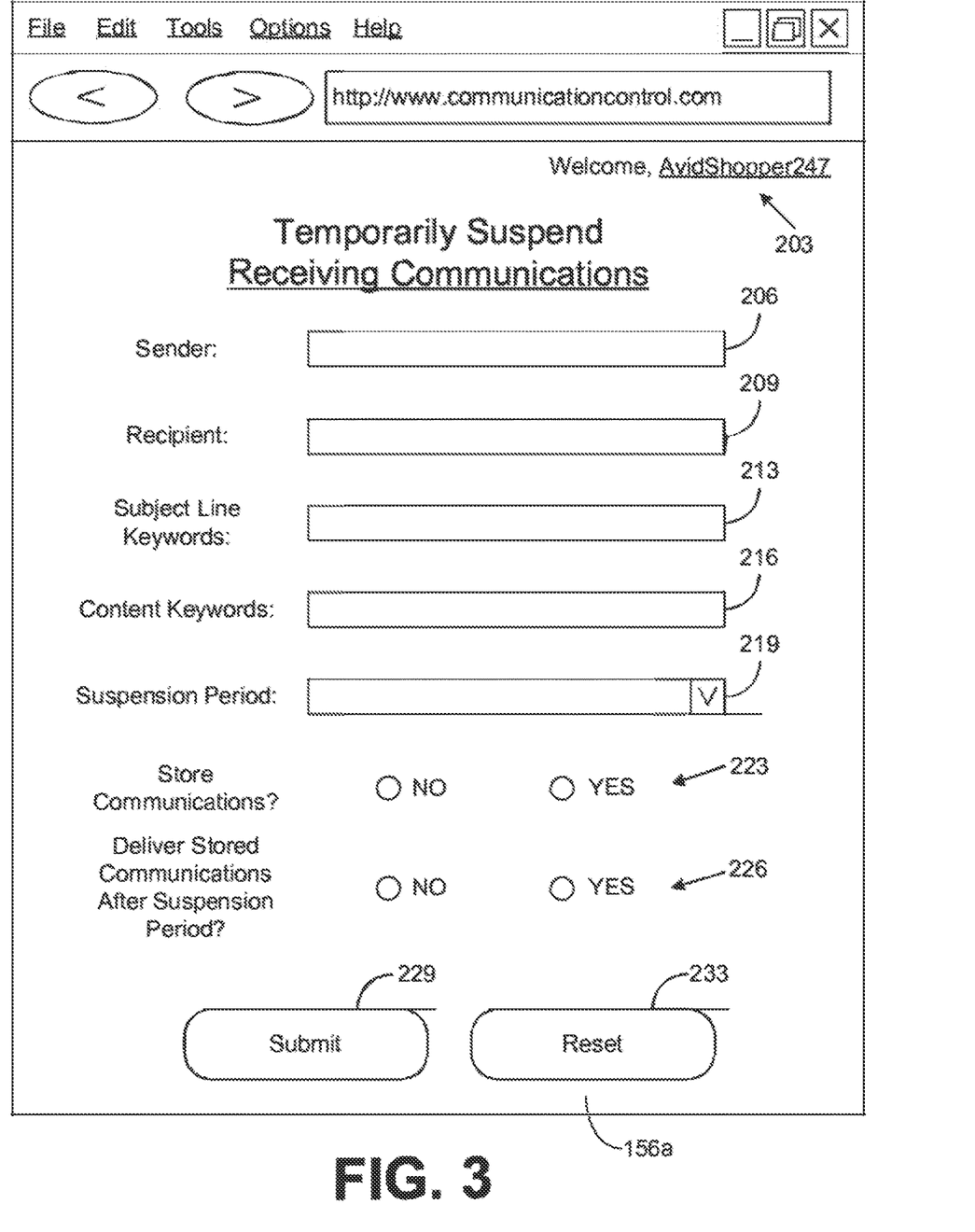
FIGS. 3 and 4 are screen shots of a recipient interface rendered by a client in the networked environment of FIG. 1 according to one embodiment of the present disclosure.

FIG. 3 is one example of a network page 156, denoted herein as network page 156a, according to various embodiments of the present disclosure. In one embodiment, the network page 156a is generated by the transmission service 116 (FIG. 1) and provided by the computing device 103 (FIG. 1). The browser 153 then renders the network page 156a on the display 159 of the client 106. The blocks and components that comprise network page 156a represent one example of an approach to present the content depicted in the network page 156a.

In this embodiment, network page 156a depicts an interface for the recipient 123 (FIG. 1) to request a temporary suspension of receipt of electronic communications 146 (FIG. 1). The network page 156a includes a recipient ID 283, a sender field 206, a recipient field 209, a subject line field 213, a keywords field 216, a suspension field 219, a store communications block 223, a deliver stored communications block 226, a submit button 229, a reset button 233, and a view stored communications button 236. In one embodiment, the recipient ID 203 represents the unique recipient identifier of the recipient 123 currently accessing the network page 156a.

The sender field 206, recipient field 209, subject line field 216, and keywords field 219 provide for the recipient 123 to indicate a number of suspension preferences 136 (FIG. 1). For example, in the sender field 206, the recipient 123 may provide identifying information of a sender of electronic communications 146 such as, names, email addresses, social networking handles, fax numbers, and/or any other type of contact information. In the recipient field 209, the recipient 123 may provide identifying information of distribution lists, recipient groups, social networking groups, and/or any other listing of recipient groups to which electronic communications 146 are addressed. For example, the recipient 123 may belong to an email distribution list 147 (FIG. 1) for shoppers of a particular item. The recipient 123 may wish to temporarily suspend all emails transmitted to the email accounts listed in the distribution list 147.

In the subject line field 213, the recipient 123 may provide identifying keywords that may appear in a subject line of electronic communications 146. For example, the recipient 123 may wish to suspend receiving communications advertising holiday sales in the subject line, such as, any Valentine's Day sales, Black Friday sales, back to school sales, and/or any other type of holiday sale. Additionally, the recipient 123 may wish to temporarily suspend electronic communications 146 with any other keyword that may appear in the subject line, such as, for example, names of items, geographic locations of retailers, magnitude of discounts, and/or any other keyword. Similarly, in the content field 216, the recipient 123 may provide keywords that may appear in the content of the electronic communications 146, as can be appreciated.

In the suspension field 219, the recipient 123 may indicate a suspension period 133 (FIG. 1) to indicate the duration of the temporary suspension. For example, the recipient 123 may provide a range of dates to indicate the duration, a resume date when transmission of electronic communication resumes, a month during which transmission of electronic communications will be suspended, and/or other input to indicate the duration. In one embodiment the suspension field 219 may include a default value and/or a drop down menu from which the recipient 123 may select a suspension period 133.

In the store communications block 223, the recipient 123 may indicate whether to store the electronic communications 146 scheduled to be delivered during the suspension period 133. For example, the recipient 123 may wish to access those electronic communications 146 at a later time, as described above. In this example, the transmission 116 may store the electronic communications 146 as suspended communications 139 (FIG. 1) in association with the recipient data 119 (FIG. 1) of the recipient 123. Additionally, in the deliver stored communications block 226, the recipient 123 may indicate whether to deliver the contents of the suspended communications to the recipient 123 when the suspension period 133 expires. For example, the recipient 123 may wish to receive all of the suspended communications as a single email communication at the end of the suspension period 133.

Additionally, invoking the submit button 229 transmits the request to the transmission service 116 to suspend transmitting electronic communications 146 to the recipient 123 according to the suspension preferences 136 for the suspension period 133. Invoking the reset button 233 transmits a request to reset the fields and blocks depicted in the network page 156a.

Figure 4:
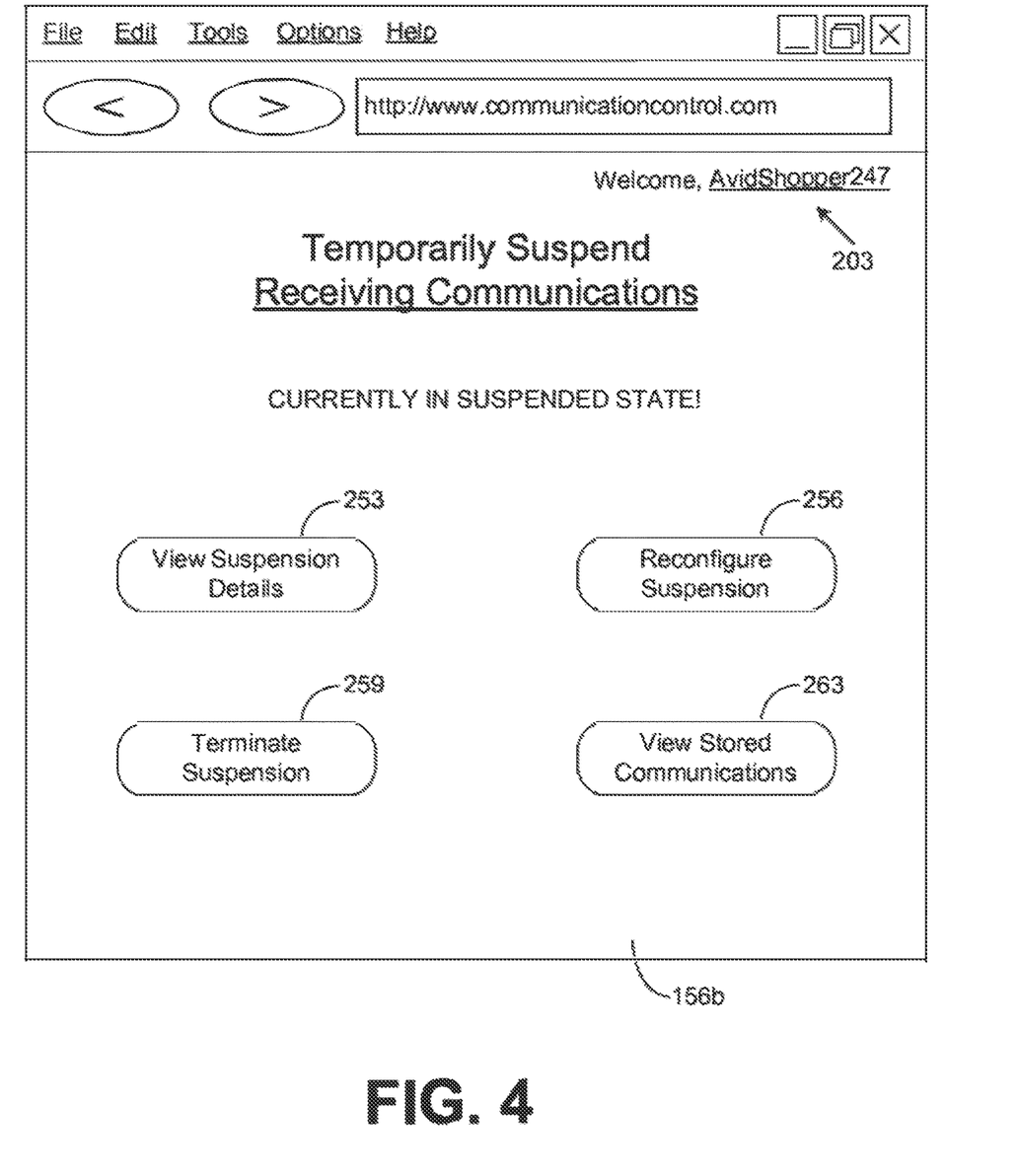

In FIG. 4, shown is one example of a network page 156, denoted herein as network page 156b, according to some embodiments of the present disclosure. In one embodiment, the network page 156b is generated by the transmission service 116 (FIG. 1) and provided by the computing device 103 (FIG. 1). The browser 153 then renders the network page 156b on the display 159 of the client 106. The blocks and components that comprise network page 156 represent one example of an approach to present the content depicted in the network page 156b.

In this embodiment, network page 156b depicts an interface for the recipient 123 (FIG. 1) to manage the suspension of electronic communications 146 (FIG. 1) after the recipient 123 has already requested the electronic communications 146 to be suspended. As shown in FIG. 4, the network page 156b includes a view suspension details button 253, a reconfigure suspension button 256, a terminate suspension button 259, and a view stored communications button 263. In one embodiment, invoking the view suspension details button 253 transmits a request to the transmission service 116 to generate a new network page 156 to depict the suspension configurations previously established by the recipient 123. For example, the new network page 156 may depict the suspension period 133 (FIG. 1), the suspension preferences 136 (FIG. 1), and/or any other suspension related setting.

Additionally, invoking the reconfigure suspension button 256 transmits a request to the transmission service 116 to re-establish the suspension settings. For instance, the recipient 123 may be presented with the contents of network page 156a (FIG. 2) to provide a new set of parameters for the fields included in network page 156a. Invoking the terminate suspension button 259 transmits a request to the transmission service 116 to terminate the suspension of receipt of electronic communications previously requested by the recipient 123. For example, the recipient 123 may request the terminate being in the suspension state 129 (FIG. 1) prior to the expiration of the suspension period 133 (FIG. 1). Finally, invoking the view stored communications button 263 transmits a request to the transmission service 116 to view the suspended communications 139 (FIG. 1) stored in the data store 113 (FIG. 1). For example, the transmission service 116 may provide a new network page 156 that depicts the contents of the suspended communications 139, as can be appreciated.

Figure 5:
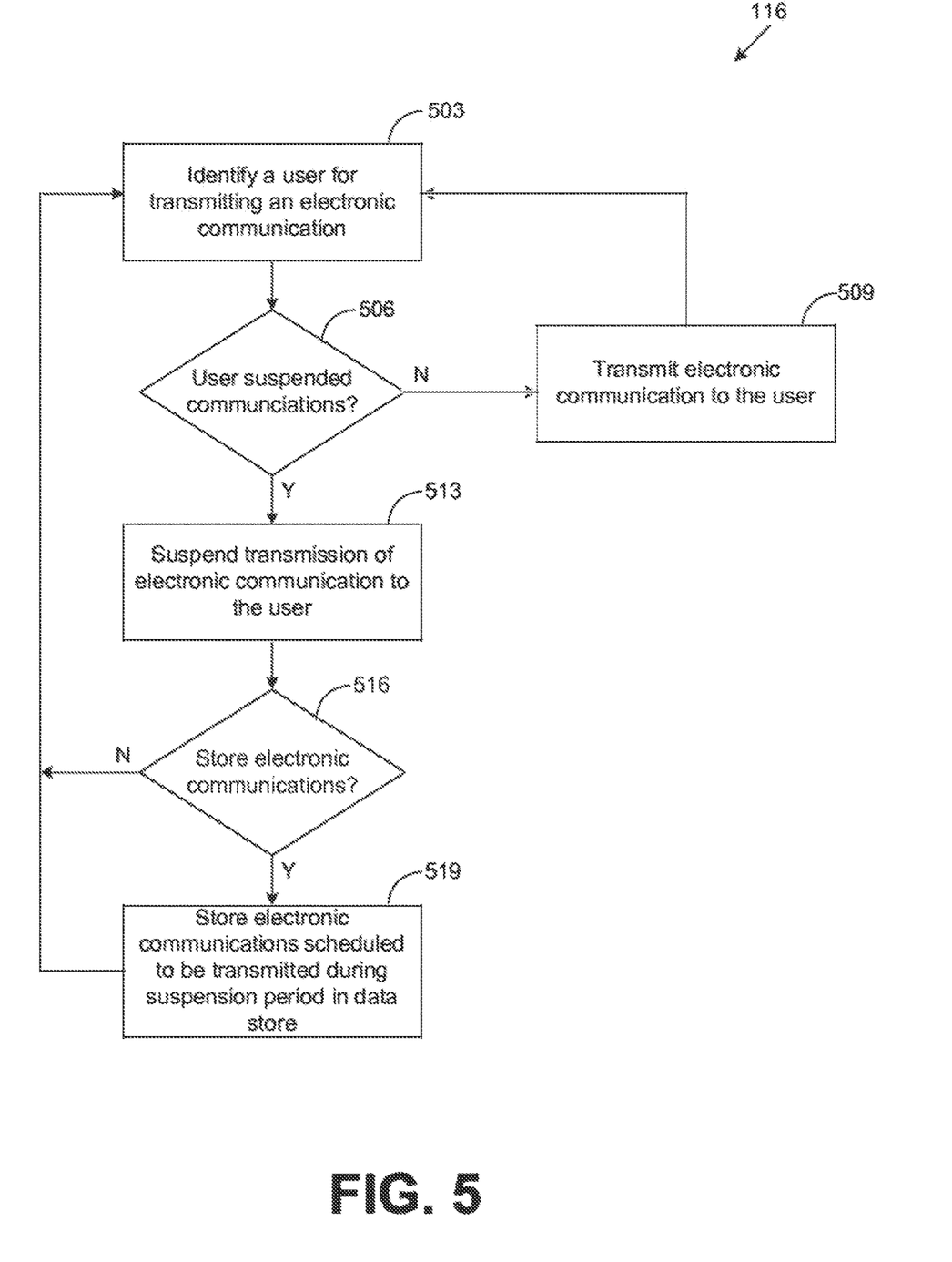
FIG. 5 is a flowchart illustrating an example of functionality implemented as portions of a transmission service executed in a computing device in the networked environment of FIG. 1 according to one embodiment of the present disclosure.

FIG. 5 is a flowchart that proves one example of the operation of a portion of the transmission service 116 according to various embodiments. It is understood that the flowchart of FIG. 5 provides merely an example of the many different types of functional arrangements that may be employed to implement the operation of the portion of the transmission service 116 as described herein. As an alternative, the flowchart of FIG. 5 may be viewed as depicting an example of steps of a method implemented in the computing device 103 (FIG. 1) according to one or more embodiments.

Beginning with box 503, the transmission service 116 identifies a recipient 123 (FIG. 2) to transmit an electronic communication 146 (FIG. 1). For instance, the transmission service 116 may parse a distribution list 147 (FIG. 1) to identify recipients 123 to whom an electronic communication 146 is scheduled for transmission. The transmission service 116 may process each recipient 123 on the distribution list 147 in a sequential manner to determine whether to transmit an electronic communication to each of the respective recipients 123, as described above.

In box 506, the transmission service 116 determines whether the recipient 123 has suspended receiving electronic communications 146. In one embodiment, the recipient 123 may have previously transmitted a request to the transmission service 116 to suspend electronic communications 146 for a suspension period 133 (FIG. 1), as shown on network page 156a (FIG. 2). The transmission service 116 may have updated the suspension state 129 (FIG. 1) when the recipient 123 previously submitted the request to suspend. Thus, in one embodiment, the transmission service 116 may determine whether the recipient 123 has previously suspended receiving electronic communications 146 by analyzing the suspension state 129 associated with the recipient 123. For example, the suspension state 129 may be represented by a Boolean value indicating the preference of the recipient 123.

If the transmission service 116 determines that the recipient 123 has not suspended receiving electronic communications 146, then the transmission service 116 proceeds to box 509 to transmit the electronic communication 146 to the recipient 123. For example, the transmission service 116 may facilitate an email transmission of a electronic communication 146 (FIG. 1) provided by a source 143 (FIG. 1), as described above. The transmission service 116 then returns to box 503 to process a next recipient 123 listed in the distribution list 147.

Returning to box 506, if the transmission service 116 determines that the recipient 123 has suspended receiving elect communications 146, then the transmission service 116 suspends the transmission of the electronic communication 146 to the recipient 123, as shown in box 513. In one embodiment, the transmission service 116 may proceed to box 503 and advance to the next recipient 123 listed in the distribution list 147 to repeat the process, as described above. In another embodiment, the transmission service 116 advances to box 516 to determine whether the recipient 123 has requested to store the electronic communications scheduled for delivery during the suspension period 133.

If the transmission service 116 determines that the recipient 123 has requested to store the electronic communications 146, then transmission service 116 proceeds to box 519 to store the electronic communications 146. In one embodiment, the transmission service 116 stores the electronic communications 146 as suspended communications, as described above. Upon storing the electronic communications 146, the transmission service 116 proceeds to box 503 to process a next recipient 123 in the distribution list 147, as described above. Returning to box 516, if the transmission service 116 determines that the recipient 123 has not requested to store the electronic communications 146, then the transmission service 116 proceeds to box 503 to process a next recipient 123 in the distribution list 147, as described above.

Figure 6:
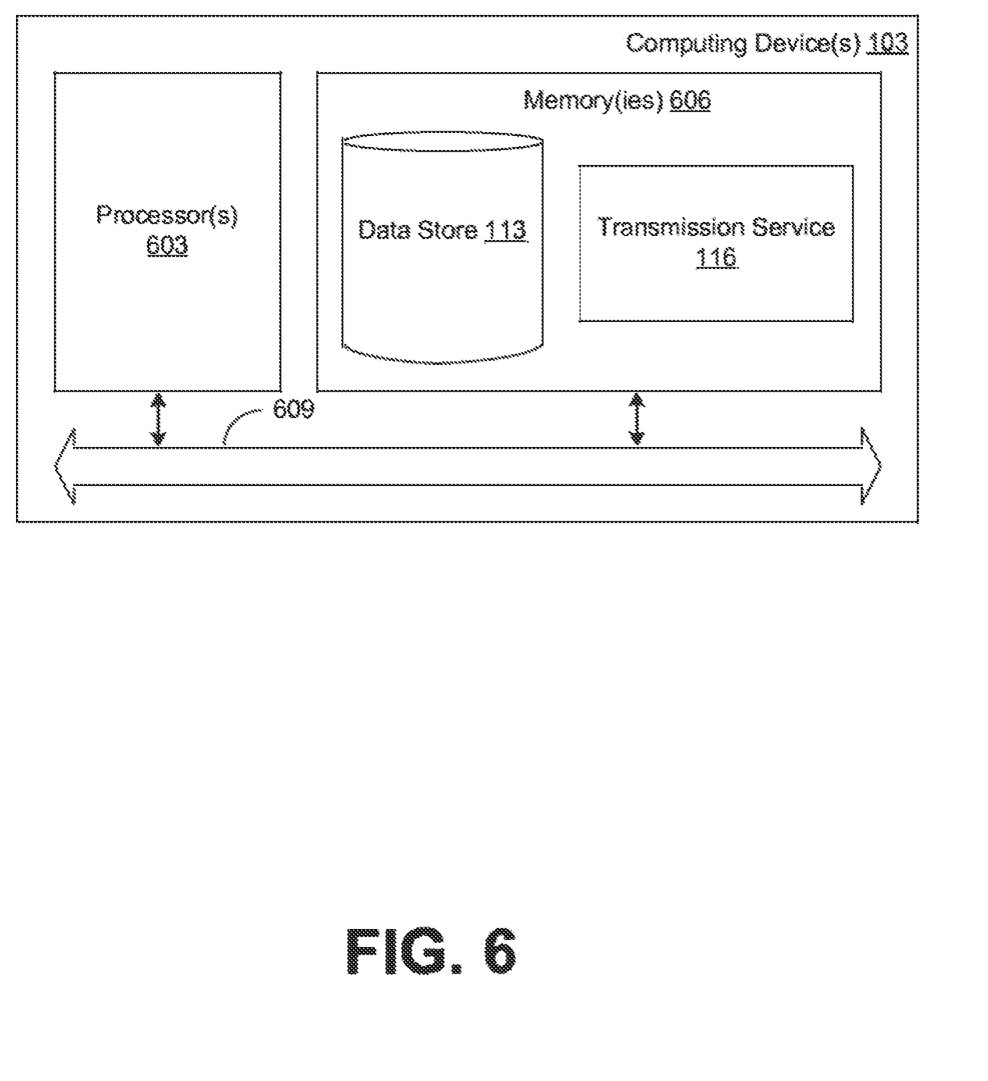
FIG. 6 is a schematic block diagram that provides one example illustration of a computing device employed in the networked environment of FIG. 1 according to one embodiment of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are a transmission service 116, and potentially other applications. Also stored in the memory 606 may be a data store 113 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any One of a number of programming languages may be employed such as, for example C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program fie that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, sold-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example random access memory (RAM), read-only memory (ROM), hard disk drives, solid state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), a electrically erasable programmable read-only memory (EEPROM), or other like memory device.

In addition, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the transmission service 116, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 the functionality and operation of an implementation of portions of the transmission service 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 a specific order of execution, it is understood that the order of execution may differ from that which is depicted. For example, the order of execution of two or more blocks may be scrambled relative to the order shown. In addition, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the transmission service 116, that comprises software or code can be embodied in any non-transitory computer-readable medium for use by or in connection with an instruction execution system such as, for example, a processor 60 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes magnetic hard drives, memory cards, sold-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:

transmitting, by a computing device executing code stored on a non-transitory, computer readable, tangible medium, a first interface configured for display on a recipient device, the interface comprising a recipient identifier (ID), a store communications block, a deliver stored communications block, and one or more fields, wherein the store communications block and the deliver stored communications block are each configured to receive input data from a recipient indicating a first state or a second state, and each field is configured for the recipient to provide data indicating at least one suspension preference;

receiving, by the computing device, a request to suspend transmission of one or more electronic communications to the recipient for a suspension period, the request comprising the recipient identifier (ID) for the recipient and the one or more fields, wherein a determination to suspend transmission is based at least in part on data provided by the recipient in the one or more fields;

associating, by the computing device, the recipient ID with a suspension state based at least in part on the determination to suspend transmission;

suspending, by the computing device, transmission of the one or more electronic communications during the suspension period by preventing the one or more electronic communications from being transmitted to the recipient based on the suspension state being associated with the recipient ID;

storing the one or more electronic communications received during the suspension period when the store communications block is set to the first state;

delivering content from the one or more electronic communications received and stored during the suspension period after the suspension period expires, when the deliver stored communication block is set to the first state; and responsive to determining an expiration of the suspension period, de-associating, by the computing device, the recipient ID with the suspension state, and transmitting at least one of the electronic communications to the recipient.

2. The method of claim 1, wherein the one or more fields comprises a suspension field configured to receive data indicating a time duration for the suspension period.

3. The method of claim 1, wherein the one or more fields comprises a subject line field or a content field configured to receive data comprising one or more keywords.

4. The method of claim 1, wherein the one or more fields comprises a sender field configured to receive identifying data of a sender of the electronic communications.

5. The method of claim 1, wherein the one or more fields comprises a recipient field configured to receive identifying data of one or more recipient individuals, distribution lists, recipient groups, or social networking groups.

6. The method of claim 1, further comprising transmitting, by the computing device prior to the expiration of the suspension period, a suspension management interface configured for display on the recipient device, the suspension management interface comprising the recipient ID, a view suspension details button, a reconfigure suspension button, a terminate suspension button, and a view stored communications button.

7. The method of claim 6, wherein invoking the view suspension details button transmits a request to the to the computing device to generate a network page configured for display on the recipient device depicting the recipient ID and one or more suspension preferences previously set by the recipient.

8. The method of claim 6, wherein invoking the terminate suspension button transmits a request to the computing device to terminate the suspension period prior to the expiration of the suspension period.

9. The method of claim 6, wherein invoking the view stored communications button transmits a request to the computing device to transmit a network page configured for display on the recipient device depicting the content from the one or more electronic communications received and stored during the suspension period.

10. The method of claim 6, wherein the reconfigure suspension button transmits a request to the computing device to transmit a second interface configured for display on the recipient device, the second interface comprising the recipient ID and one or more fields, wherein each field is configured for the recipient to provide data indicating at least one suspension preference.

11. A non-transitory computer readable medium comprising at least one memory storing one or more instructions that, upon execution by one or more processors, perform:
   transmitting, by a computing device, a first interface configured for display on a recipient device, the interface comprising a recipient identifier (ID), a store communications block, a deliver stored communications block, and one or more fields, wherein the store communications block and the deliver stored communications block are each configured to receive input data from a recipient indicating a first state or a second state, and each field is configured for the recipient to provide data indicating at least one suspension preference;
   receiving, by the computing device, a request to suspend transmission of one or more electronic communications to the recipient for a suspension period, the request comprising the recipient identifier (ID) for the recipient and the one or more fields, wherein a determination to suspend transmission is based at least in part on data provided by the recipient in the one or more fields;
   associating, by the computing device, the recipient ID with a suspension state based at least in part on the determination to suspend transmission;
   suspending, by the computing device, transmission of the one or more electronic communications during the suspension period by preventing the one or more electronic communications from being transmitted to the recipient based on the suspension state being associated with the recipient ID;
   storing, by the computing device, the one or more electronic communications received during the suspension period when the store communications block is set to the first state;
   delivering, by the computing device, content from the one or more electronic communications received and stored during the suspension period after the suspension period expires, when the deliver stored communication block is set to the first state; and
   responsive to determining an expiration of the suspension period, de-associating, by the computing device, the recipient ID with the suspension state, and transmitting at least one of the electronic communications to the recipient.

12. The non-transitory computer readable medium of claim 11, further comprising the step of: transmitting, by the computing device prior to the expiration of the suspension period, a suspension management interface configured for display on the recipient device, the suspension management interface comprising the recipient ID, a view suspension details button, a reconfigure suspension button, a terminate suspension button, and a view stored communications button.

13. The non-transitory computer readable medium of claim 12, wherein invoking the view suspension details button transmits a request to the to the computing device to generate a network page configured for display on the recipient device depicting the recipient ID and one or more suspension preferences previously set by the recipient.

14. The non-transitory computer readable medium of claim 12, wherein invoking the terminate suspension button transmits a request to the computing device to terminate the suspension period prior to the expiration of the suspension period.

15. The non-transitory computer readable medium of claim 12, wherein invoking the view stored communications button transmits a request to the computing device to transmit a network page configured for display on the recipient device depicting the content from the one or more electronic communications received and stored during the suspension period.

16. The non-transitory computer readable medium of claim 12, wherein the reconfigure suspension button transmits a request to the computing device to transmit a second interface configured for display on the recipient device, the second interface comprising the recipient ID and one or more fields, wherein each field is configured for the recipient to provide data indicating at least one suspension preference.

17. A system comprising:
   at least one computing device;
   a data store configured to:
   store a plurality of recipient identifiers (IDs); and
   associate the recipient ID with a suspension state based at least in part on a determination to suspend transmission; and
   a transmission service executable on the at least one computing device; the transmission service configured to:

transmit a first interface configured for display on a recipient device, the interface comprising a recipient identifier (ID), a store communications block, a deliver stored communications block, and one or more fields, wherein the store communications block and the deliver stored communications block are each configured to receive input data from a recipient indicating a first state or a second state, and each field is configured for the recipient to provide data indicating at least one suspension preference;

receive a request from the recipient device to suspend transmission of one or more electronic communications to the recipient for a suspension period, the request comprising the recipient ID for the recipient and the one or more fields, wherein the determination to suspend transmission is based at least in part on data provided by the recipient in the one or more fields;

suspend transmission of the one or more electronic communications during the suspension period by preventing the one or more electronic communications from being transmitted to the recipient based on the suspension state being associated with the recipient ID;

store the one or more electronic communications received during the suspension period when the store communications block is set to the first state;

deliver content from the one or more electronic communications received and stored during the suspension period after the suspension period expires, when the deliver stored communication block is set to the first state; and responsive to determining an expiration of the suspension period, de-associate, by the computing device, the recipient ID with the suspension state, and transmitting at least one of the electronic communications to the recipient.

* * * * *